(12) United States Patent
Kim et al.

(10) Patent No.: US 8,599,248 B2
(45) Date of Patent: Dec. 3, 2013

(54) METHOD FOR DISPLAYING A STEREOSCOPIC IMAGE AND STEREOSCOPIC IMAGE DISPLAY DEVICE FOR PERFORMING THE METHOD

(75) Inventors: Hwi Kim, Seoul (KR); Hae-Young Yun, Suwon-si (KR); Kyung-Ho Jung, Seoul (KR); Seung-Hoon Lee, Hwaseong-si (KR); Hee-Seop Kim, Hwaseong-si (KR); Jian-Gang Lu, Suwon-si (KR); Jung-Hwan Yi, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 926 days.

(21) Appl. No.: 12/684,438

(22) Filed: Jan. 8, 2010

(65) Prior Publication Data

US 2011/0037838 A1 Feb. 17, 2011

(30) Foreign Application Priority Data

Aug. 11, 2009 (KR) ........................ 10-2009-0073610

(51) Int. Cl.
*H04N 13/04* (2006.01)
(52) U.S. Cl.
USPC ............................................. 348/56; 348/59

(58) Field of Classification Search
USPC ....................................................... 348/56, 59
See application file for complete search history.

(56) References Cited

U.S. PATENT DOCUMENTS

| 5,300,942 A * | 4/1994 | Dolgoff .......................... 345/32 |
| 7,345,664 B2 * | 3/2008 | Chang ............................. 345/87 |
| 8,362,975 B2 * | 1/2013 | Uehara .......................... 345/32 |
| 2007/0035707 A1 * | 2/2007 | Margulis ....................... 353/122 |
| 2010/0002295 A1 * | 1/2010 | Kimpe .......................... 359/465 |

* cited by examiner

*Primary Examiner* — Sath V Perungavoor
*Assistant Examiner* — Jeffery Williams
(74) *Attorney, Agent, or Firm* — H.C. Park & Associates, PLC

(57) ABSTRACT

A stereoscopic image display device includes a display panel, a temporal division plate and a lenticular lens. The display panel includes a gate line, a data line, and a unit pixel of a horizontal pixel structure in which a long side is parallel with the first direction and a short side is parallel with the second direction. The display panel displays a 2D image based on an image control signal. The temporal division plate includes a plurality of shutters disposed on the display panel extending in the second direction. The temporal division plate opens and closes m shutters corresponding to each unit pixel, in a sequence, 'm' being a natural number no less than 2). The lenticular lens is disposed on the temporal division plate to convert the 2D image passing the temporal division plate into a 3D image.

21 Claims, 18 Drawing Sheets

METHOD FOR DISPLAYING A STEREOSCOPIC IMAGE AND STEREOSCOPIC IMAGE DISPLAY DEVICE FOR PERFORMING THE METHOD

CROSS REFERENCE TO RELATED APPLICATION

This application claims priority from and the benefit of Korean Patent Application No. 2009-0073610, filed on Aug. 11, 2009, which is hereby incorporated by reference for all purposes as if fully set forth herein.

BACKGROUND OF THE INVENTION

1. Field of the Invention

Exemplary embodiments of the present invention relate to a method for displaying a stereoscopic image and a stereoscopic image display device for performing the method. More particularly, Exemplary embodiments of the present invention relate to a method for displaying a stereoscopic image in a lenticular type and a stereoscopic image display device for performing the method.

2. Description of the Related Art

Generally, a stereoscopic image display device displays a three-dimensional (3D) image based on the principle of binocular parallax that is observed with the left and right eyes. For example, since the left and right eyes of a human are spaced apart from each other, two different images at two different angles are inputted to the brain. Similarly, the observer may view a 3D image to recognize a stereoscopic image through the display device. Typical stereoscopic image display devices are divided into two groups: stereoscopic displays requiring use of special spectacles, and autostereoscopic displays not requiring use of special spectacles. The stereoscopic displays include a polarizing type stereoscopic display, a time divisional type stereoscopic display and so on. The auto-stereoscopic displays include a parallax-barrier type auto-stereoscopic display, a lenticular type auto-stereoscopic display and so on.

For example, in a lenticular type auto-stereoscopic display, a two-dimensional (2D) image photographed at K viewpoints is displayed on a focusing surface of the lenticular lens of the stereoscopic image display device ('K' is a natural number no more than 2). The 2D image is refracted through the lenticular lens per K viewpoints, and the refracted 2D image is displayed on the stereoscopic image display device as a 3D image.

Recently, in order to decrease the number of a source driving chip, display devices use a structure in which different color pixels are connected to one data line, that is, a horizontal pixel structure. In such a display device there are more gate lines than data lines. In this case, each of the pixels of the horizontal pixel structure has a long side along a horizontal direction and a short side along a vertical direction.

However, with a display device using a horizontal pixel structure, there are fewer pixels arranged along a horizontal direction in comparison with a conventional display device. Thus, when the display device using the horizontal pixel structure uses a lenticular type auto-stereoscopic display, a 2D image photographed at K viewpoints is refracted through the lenticular lens per viewpoints numbering less than K, so that a 3D image is not displayed.

SUMMARY OF THE INVENTION

Exemplary embodiments of the present invention relate to a method for displaying stereoscopic image, which is capable of realizing a stereoscopic image on a display panel having a horizontal pixel structure.

Exemplary embodiments of the present invention also relate to a stereoscopic image display device for performing the above-mentioned method.

Additional features of the invention will be set forth in the description which follows, and in part will be apparent from the description, or may be learned by practice of the invention.

An exemplary embodiment of the present invention discloses a method of displaying a stereoscopic image, the method including receiving an image signal, displaying a two-dimensional (2D) image on a display panel based on the image signal, the display panel including a plurality of gate lines extending in a first direction, a plurality of data lines extending in a second direction, and a plurality of unit pixels disposed in both the first direction and the second direction, each of the plurality of unit pixels including a long side in parallel with the first direction and a short side in parallel with the second direction, opening and closing m shutters in a first sequence, 'm' being a natural number no less than 2, the m shutters corresponding to each of the unit pixels disposed in the first direction, the m shutters being included in a temporal division plate including a plurality of shutters, the temporal division plate being disposed on the display panel such that each of the plurality of shutters extends in the second direction, and converting the 2D image into a three-dimensional (3D) image, the 2D image passing through the temporal division plate and through a plurality of lenticular lenses disposed on the temporal division plate.

An exemplary embodiment of the present invention also discloses a stereoscopic image display device including a display panel to display a two-dimensional (2D) image based on an image control signal, the display panel including a plurality of gate lines extending in a first direction, a plurality of data lines extending in a second direction, and a plurality of unit pixels disposed in both the first direction and the second direction, each of the plurality of unit pixels including a long side in parallel with the first direction and a short side in parallel with the second direction, a temporal division plate disposed on the display panel, the temporal division plate including a plurality of shutters, each of the plurality of shutters extending in the second direction, wherein the temporal division plate is configured to open and close m shutters in a sequence, 'm' being a natural number no less than 2, the m shutters corresponding to each of the unit pixels disposed in the first direction, and a plurality of lenticular lenses disposed on the temporal division plate to convert the 2D image passing through the temporal division plate into a three-dimensional (3D) image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
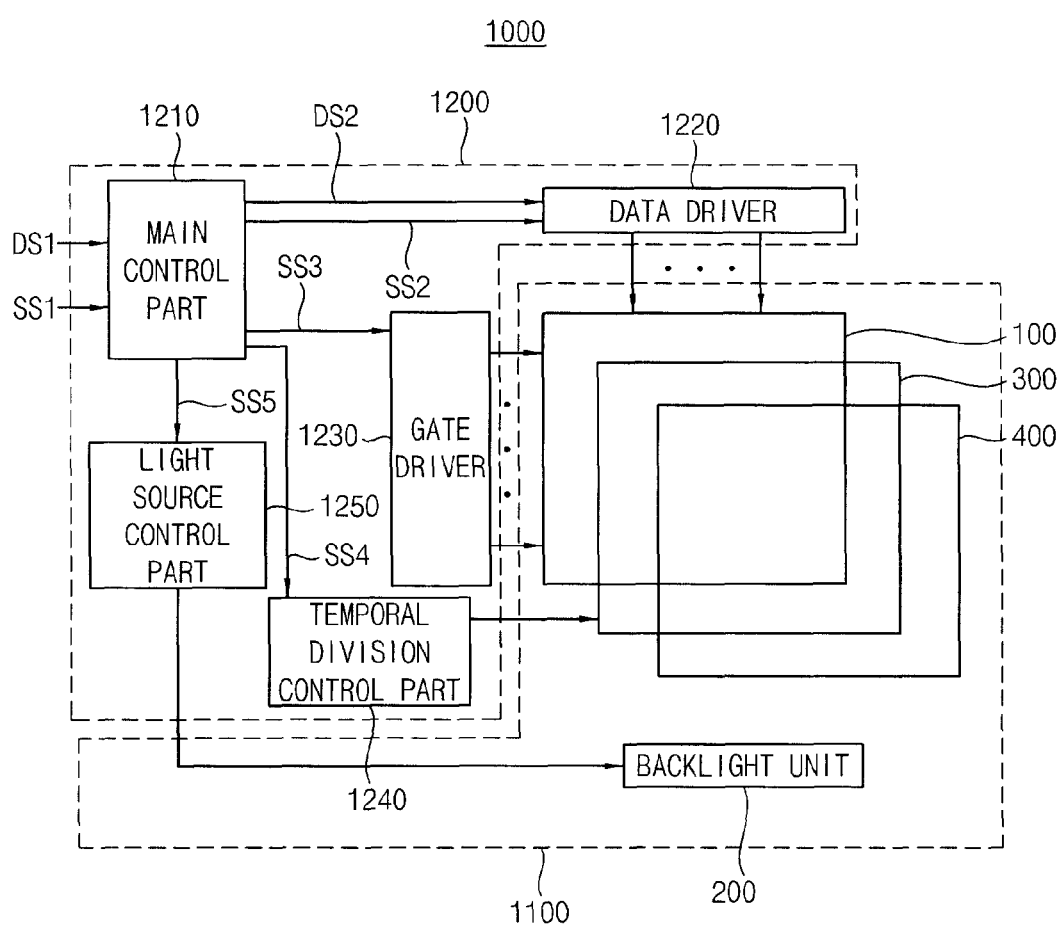
FIG. 1 is a block diagram illustrating a stereoscopic image display device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to limit the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
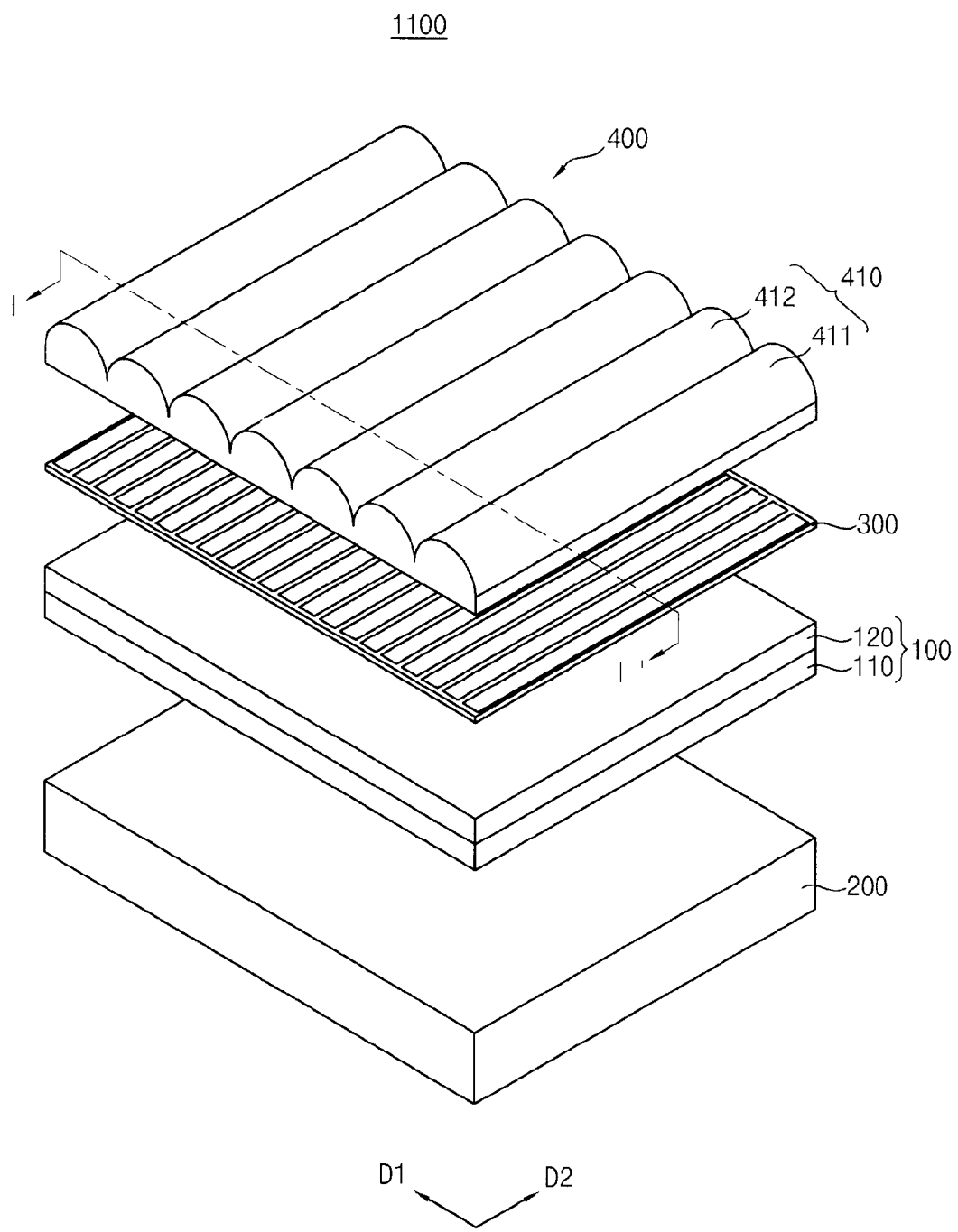
FIG. 2 is a perspective view of the display part and the backlight unit of FIG. 1.

FIG. 1 is a block diagram illustrating a stereoscopic image display device 1000 according to an exemplary embodiment of the present invention. FIG. 2 is a perspective view of the display part 1100 and the backlight unit 200 of FIG. 1.

Referring to FIG. 1 and FIG. 2, the stereoscopic image display device 1000 includes a display part 1100 and a control part 1200.

The display part 1100 includes a display panel 100, a backlight unit 200, a temporal division plate 300 and a lenticular plate 400.

The display panel 100 is disposed on the backlight unit 200, the temporal division plate 300 is disposed on the display panel 100, and the lenticular plate 400 is disposed on the temporal division plate 300.

The display panel 100 includes a display substrate 110 and an opposite substrate 120 opposite to the display substrate 110. The display panel 100 may include a liquid crystal layer (not shown) interposed between the display substrate 110 and the opposite substrate 120. The display panel 100 receives light from the backlight unit 200. The display panel 100 may display images by controlling a light transmittance through application of voltage to the liquid crystal layer.

An image displayed on the display panel 100 is temporally divided through the temporal division plate 300, and then the temporally divided image is spatially divided through the lenticular plate 400.

For example, the display panel 100 may receive at least two multi-viewpoint signals from an external device (not shown) to display a 2D image. The viewpoint signal is an image signal that is used to view the stereoscopic image through left and right eyes of an observer at one fixed viewing area.

For example, in a stereoscopic image display device 1000 with nine viewpoints, the viewpoint signals may be nine viewpoint image signals, where a subject of a three-dimensional structure is photographed at positions corresponding to nine viewing areas. For another example, the viewpoint signals may be image signals that are realized in a computer graphic to correspond to the nine viewing areas. Thus the display panel 100 may display nine images, each different from the others.

The temporal division plate 300 may temporally divide an image, which partially displays the 2D image in accordance with controlled timing. According to the principle of temporal division, nine images, each different from the others may be viewed by the observer through the temporal division plate 300 as though nine images are simultaneously displayed on the display panel 100. Thus, the observer may view a stereoscopic image based on the nine different images at a plurality of areas through the lenticular plate 400.

The control part 1200 may include a main control part 1210, a data driver 1220, a gate driver 1230, a temporal division control part 1240, and a light source control part 1250.

The main control part 1210 receives a first control signal SS1 and a first image signal DS1 from an external device (not shown). The first control signal SS1 may include, for example, a vertical synchronizing signal (Vsync), a horizontal synchronizing signal (Hsync) and/or a data enable signal (DE). The Vsync represents a time required for displaying one frame. The Hsync represents a time required for displaying one line of the frame. Thus, the Hsync includes pulses corresponding to the number of pixels included in one line. The DE represents a time required for supplying the pixel with data.

For example, the first image signal DS1 may include a stereoscopic image signal. In order to realize a stereoscopic image, the first image signal DS1 may include a plurality of stereoscopic image signals, where a subject of a three-dimensional structure is photographed by an external electronic device (not shown) from at least two positions. Moreover, the first control signal SS1 may include a plurality of stereoscopic control signals corresponding to the stereoscopic image signals.

The main control part 1210 converts the first image signal DS1 into a second image signal DS2 to provide the data driver 1220 with the second image signal DS2. Where the first image signal DS1 is a standard image signal, the main control part 1210 may convert the first image signal DS1 into stereoscopic image signals to provide the data driver 1220 with the converted stereoscopic image signals.

The main control part 1210 generates a second control signal SS2 and a third control signal SS3, which control a driving timing of the display panel 100 based on the first control signal SS1. Moreover, the main control part 1210 generates a fourth control signal SS4 and a fifth control signal SS5, which control the temporal division control part 1240 and the light source control part 1250, respectively.

The data driver 1220 generates a plurality of data signals based on the second control signal SS2 and the second image signal DS2, and provides data lines of the display panel 100 with the generated data signals. The second control signal SS2 may include a clock signal, a horizontal start signal (STH) and so on.

The gate driver 1230 generates a gate signal activating a gate line of the display panel 100 based on the third control signal SS3, and then provides the gate line with the generated gate signal. The third control signal SS3 may include a vertical start signal (STV).

The temporal division control part 1240 drives the temporal division plate 300 in response to the fourth control signal SS4 provided from the main control part 1210. For example, the temporal division control part 1240 may partially open and close the temporal division plate 300 in accordance with controlled timing. For example, the temporal division control part 1240 may control sequence and timing of shutters of the temporal division plate 300, which may be opened and closed. Each of the shutters may include an opening portion and a shutter cover. Thus, the shutter cover may open and close the opening portion in accordance with a controlled sequence and a controlled timing.

The light source control part 1250 supplies power to the backlight unit 200 according to the fifth control signal SS5 provided from the main control part 1210.

The backlight unit 200 provides the display panel 100 with light in response to the power supplied from the light source control part 1250.

Figure 3:
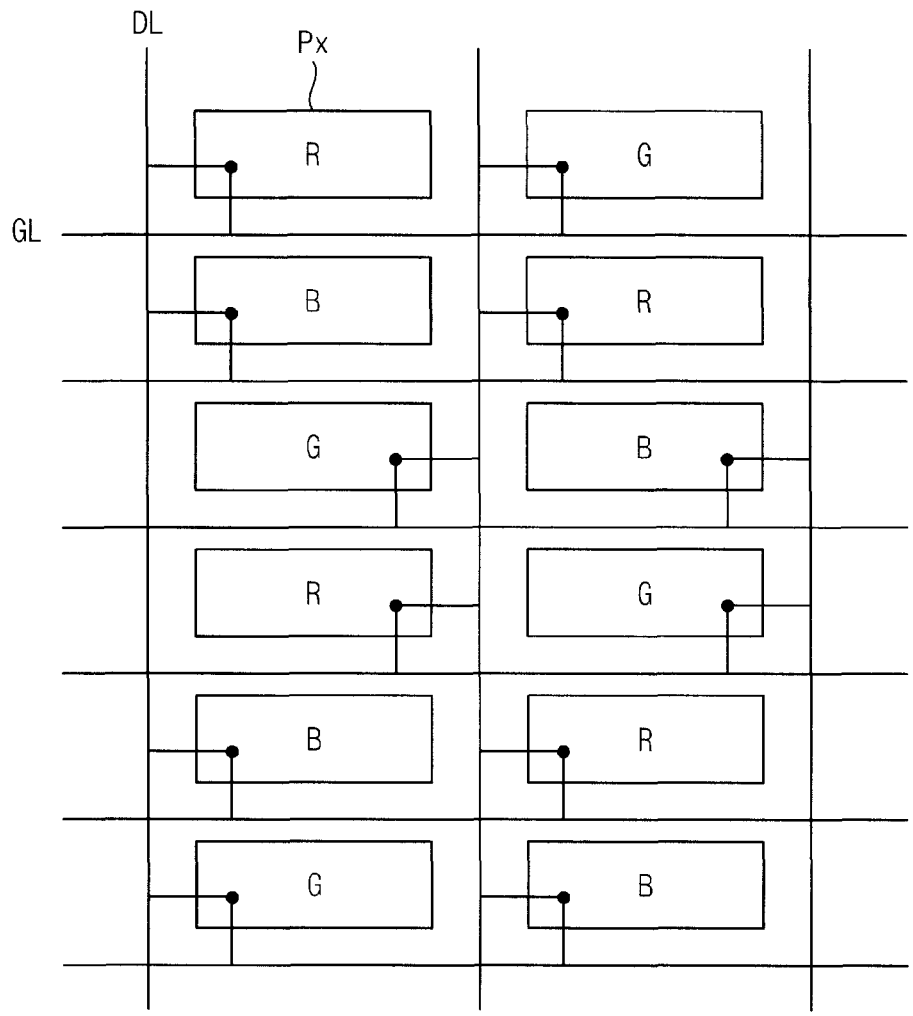
FIG. 3 is a conceptual diagram illustrating a pixel structure in accordance with an exemplary embodiment of the display panel of FIG. 2.

FIG. 3 is a conceptual diagram illustrating a pixel structure in accordance with one example of the display panel of FIG. 2.

Figure 4:
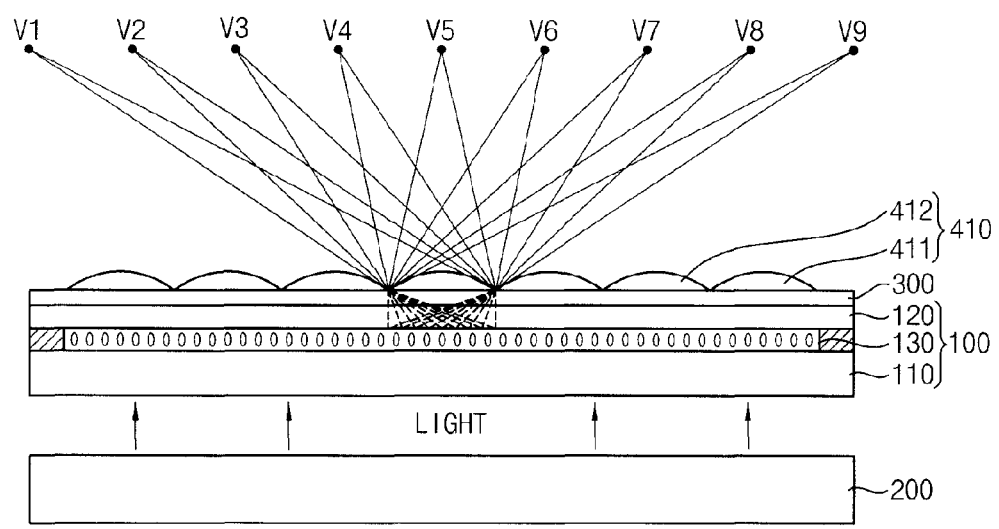
FIG. 4 is a cross-sectional view taken along a line I-I' of FIG. 2.

Referring to FIG. 2 and FIG. 3, the display panel 100 includes a liquid crystal layer 130, shown in FIG. 4, interposed between the display substrate 110 and the opposite substrate 120.

The display substrate 110 includes a gate line GL extending in a first direction D1 and a data line DL extending in a second direction D2 crossing the first direction D1.

Moreover, the display panel 100 may include a plurality of unit pixels Px. In an exemplary embodiment, the unit pixels Px may be defined by the gate lines GL and the data lines DL, however, the unit pixels Px may also be otherwise defined. The unit pixels Px display an image. The unit pixels Px may include a red pixel R, a green pixel G, and a blue pixel B. Each of the unit pixels Px is electrically connected to the gate lines GL and the data lines DL.

In this case, the unit pixels Px adjacent along the first direction D1 may include a plurality of color pixels different from each other, and the unit pixels Px adjacent along the second direction D2 may include a plurality of color pixels different from each other.

The unit pixels Px may have a long side in parallel with the first direction D1 and a short side in parallel with the second direction D2. Moreover, the display panel 100 may have more gate lines GL than data lines DL.

FIG. 4 is a cross-sectional view taken along a line I-I' of FIG. 2.

Referring to FIG. 2 and FIG. 4, the temporal division plate 300 may temporally divide an image, which partially displays the 2D image in accordance with controlled timing. According to the principle of temporal division, nine images, each different from the others may be viewed by the observer through the temporal division plate 300 as though nine images are simultaneously displayed on the display panel 100. Thus, the observer may view a stereoscopic image based on the nine different images at a plurality of areas V1, V2, V3, V4, V5, V6, V7, V8, and V9 through the lenticular plate 400.

Figure 5:
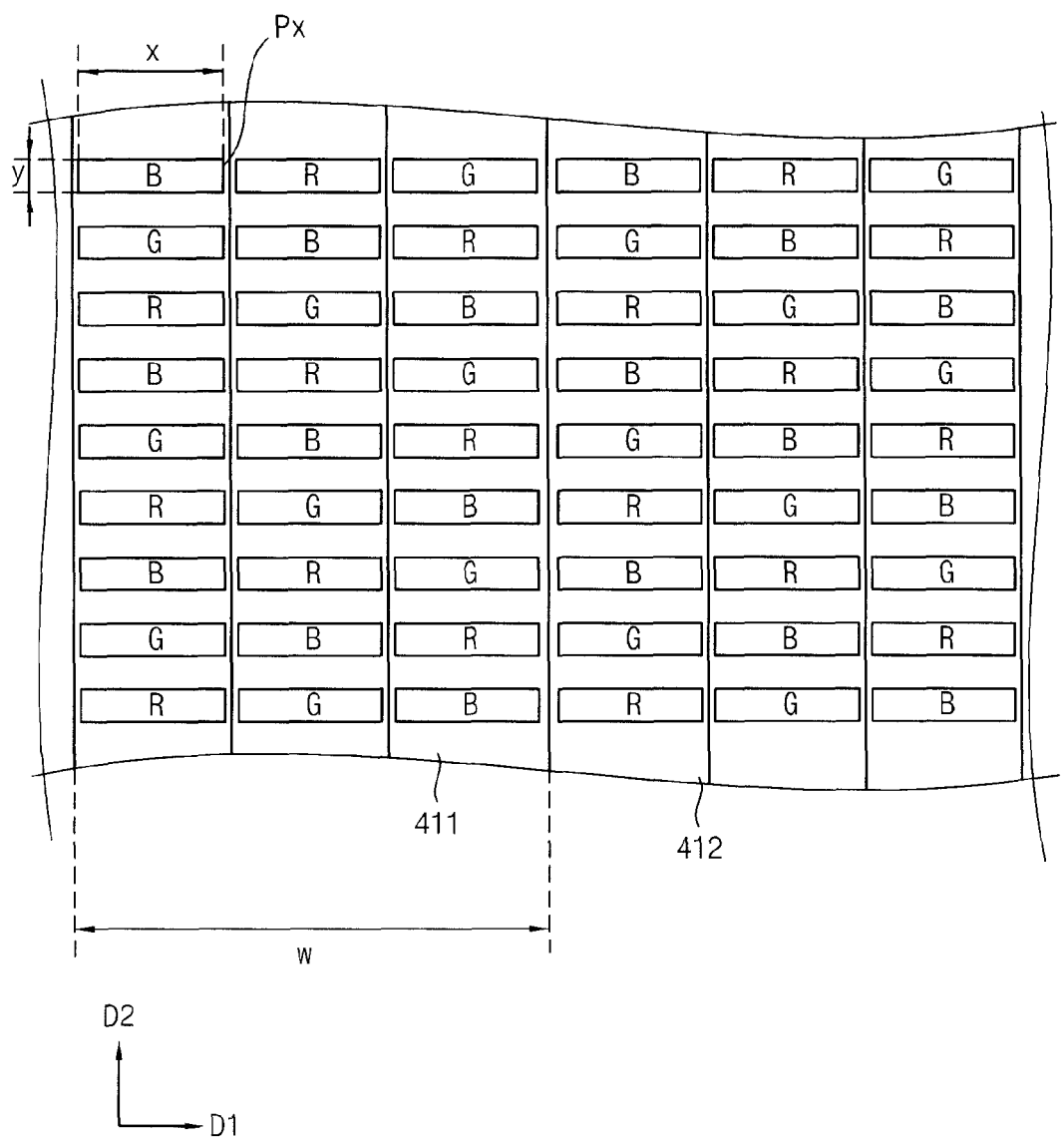
FIG. 5 is a plan view illustrating one example of unit pixels Px corresponding to the first lenticular lens and the second lenticular lens of FIG. 4.

FIG. 5 is a plan view illustrating an example of unit pixels Px corresponding to the first lenticular lens 411 and the second lenticular lens 412 of FIG. 4.

Referring to FIG. 2, FIG. 4, and FIG. 5, a length along the first direction D1 of the display panel 100 may be defined as 'w', which includes the unit pixels Px of three columns in accordance with each of the first lenticular lens 411 and the second lenticular lens 412. Moreover, a long side length of each of the unit pixels Px may be defined as 'x', and a short side length of each of the unit pixels Px may be defined as 'y'.

The unit pixels Px of three columns are arranged on the display panel 100 along the first direction D1 in accordance with each of the lenticular lenses 410 of the lenticular plate 400.

The unit pixels Px of three columns may simultaneously display three viewpoint images. Thus, the unit pixels Px of three columns may display nine viewpoint images different from each other through the temporal division plate 300 at three different times.

For example, in order to view a stereoscopic image at a plurality of areas V1, V2, V3, V4, V5, V6, V7, V8, and V9 by an observer through a lenticular lens 410, the temporal division plate 300 may sequentially expose a first pixel area, a second pixel area, and a third pixel area of the unit pixels Px at three different times. The temporal division plate 300 includes a plurality of shutters formed in the second direction D2. The temporal division plate 300 opens a portion of the shutters to partially expose the 2D image displayed on the display panel 100. In this case, a length 'x' of a long side of the unit pixel Px may be 'm' times the width of each shutter. That is, 'm' shutters may be disposed in accordance with each unit pixel Px.

In the present exemplary embodiment, there are nine viewpoints and 'm' is 3, however, 'm' may be varied in accordance with the number of viewpoints.

The lenticular lens 410 extends along the second direction D2. The lenticular plate 400 converts the 2D image into a 3D image. A cross-sectional surface of the lenticular plate 400 has a shape in which semicircles of the same size are arranged in a row. Each of the lenticular lenses 410 may correspond to a number of shutters equal to 'm' multiplied by 'n'. In this case, 'n' is the number of unit pixels Px corresponding to each lenticular lens 410. In the present exemplary embodiment, 'n' is 3. However, 'n' may be a value no less than 3.

In the areas V1, V2, V3, V4, V5, V6, V7, V8, and V9, first areas V3, V6, and V9 may define a first viewpoint set corresponding to the first areas, second areas V2, V5, and V8 may define a second viewpoint set corresponding to the second areas, and third areas V1, V4, and V7 may define a third viewpoint set corresponding to the third areas.

In FIG. 4, an image displayed on the display panel 100 corresponding to one lenticular lens 410 is divided into nine areas V1, V2, V3, V4, V5, V6, V7, V8, and V9 by the lenticular lens 410. Alternatively, however, the image may be provided into the lenticular lenses 410 included in the lenticular plate 400 by other than a display panel 100.

In order to view a stereoscopic image at the first viewpoint set V3, V6, and V9, the temporal division plate 300 only exposes the first pixel area of the unit pixels Px. In order to view a stereoscopic image at the second viewpoint set V2, V5, and V8, the temporal division plate 300 only exposes the second pixel area of the unit pixels Px. In order to view a stereoscopic image at the third viewpoint set V1, V4, and V7, the temporal division plate 300 only exposes the third pixel area of the unit pixels Px.

Thus, when the first pixel area, the second pixel area, and the third pixel area are sequentially exposed, a black image is sequentially displayed in accordance with portions except the first pixel area, the second pixel area, and the third pixel area, as they are sequentially exposed. The black image momentarily displayed thereon is not seen by an observer, and an image displayed before the black image is displayed remains as an afterimage (or an incidental image).

Therefore, an observer views images that are exposed by the temporal division plate 300, so that a stereoscopic image may be viewed at a plurality of areas V1, V2, V3, V4, V5, V6, V7, V8, and V9.

In an exemplary embodiment, each of 'm' shutters of the temporal division plate 300 corresponding to the lenticular lens 410 may be opened and closed 80 times per second. That is, a driving frequency of each of 'm' shutters may be about 80 Hz. In this case, 'm' is 3, so that shutters corresponding to all unit pixels may be sequentially opened and closed three times. Thus, the driving frequency of the temporal division plate 300 may be about 240 Hz.

Moreover, a driving frequency of the display panel 100 may be about 240 Hz. Thus, the driving frequency of the 3D image converted at the lenticular lens 410 may be equal to 240 Hz divided by 'm.' For example, where 'm' is three, the driving frequency of the 3D image may be about 80 Hz.

Figure 6A:
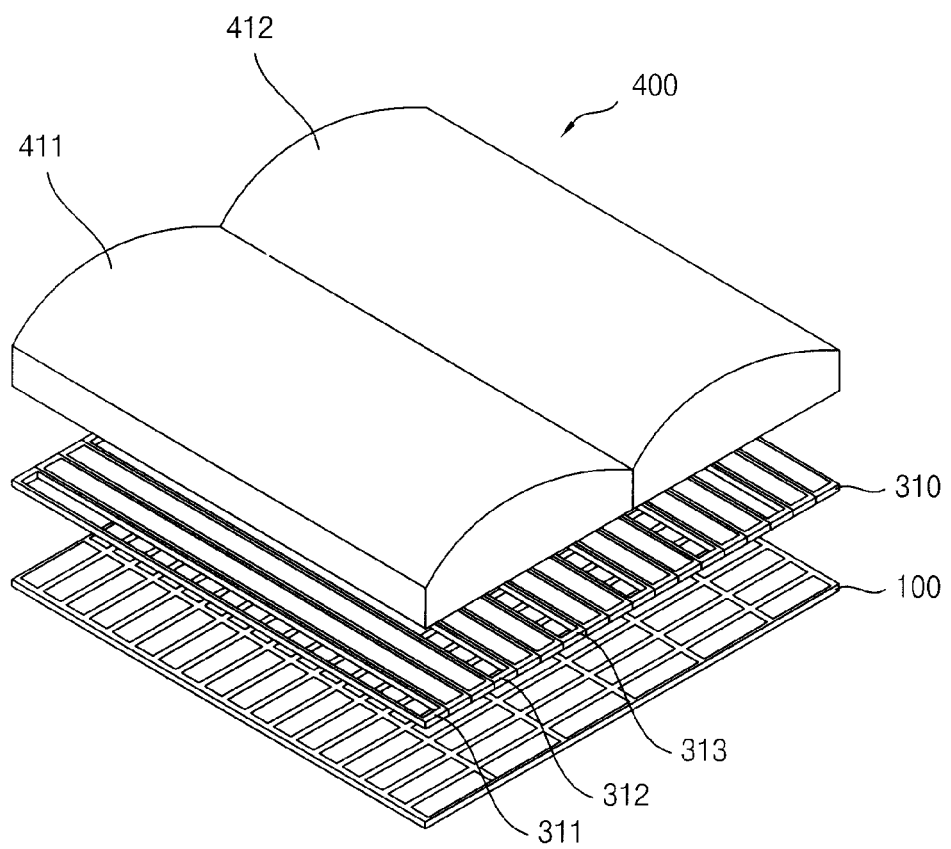
FIG. 6A is a perspective view illustrating the first lenticular lens and the second lenticular lens, a first auxiliary plate corresponding to the first pixel area and the display panel in accordance with an exemplary embodiment of the present invention.
Figure 6B:
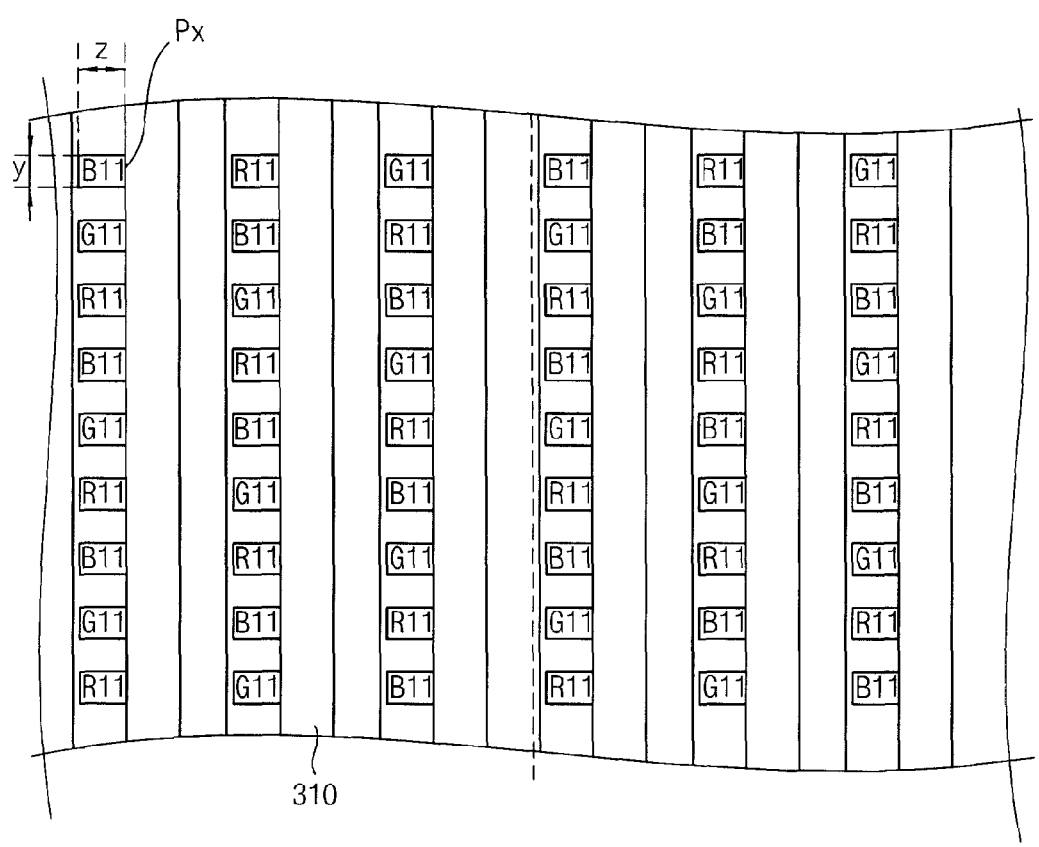
FIG. 6B is a plan view illustrating a disposed relationship between the first auxiliary plate and the display panel of FIG. 6A.

FIG. 6A is a perspective view illustrating the first lenticular lens 411 and the second lenticular lens 412, a first auxiliary plate 310 corresponding to the first pixel area R11, G11, and B11, shown in FIG. 6B, and the display panel 100 in accordance with an exemplary embodiment of the present invention.

FIG. 6B is a plan view illustrating a disposition relationship between the first auxiliary plate 310 and the display panel 100 of FIG. 6A.

Referring to FIG. 4, FIG. 5, FIGS. 6A, and 6B, the temporal division plate 300, which exposes the first pixel area R11, G11, and B11 of the unit pixels Px, will be characterized as the first auxiliary plate 310.

The first auxiliary plate 310 includes a plurality of shutters. In order to view a stereoscopic image at the first viewpoint set V3, V6, and V9, a first shutter 311, a second shutter 312, and a third shutter 313 are opened. In this case, two shutters that are not opened are disposed between the first shutter 311 and the second shutter 312, and two shutters that are not opened are disposed between the second shutter 312 and the third shutter 313.

A length along the first direction D1 of the first shutter 311, the second shutter 312, and the third shutter 313 may be 'z'. A length along the first direction D1 of the unit pixels Px may be 'x' (see FIG. 5).

The first area R11, G11, and B11 of the unit pixels Px is exposed by the first shutter 311, the second shutter 312, and the third shutter 313. No image is displayed through the first auxiliary plate 310 in accordance with the unit pixels Px except the first pixel area R11, G11, and B11.

Figure 7A:
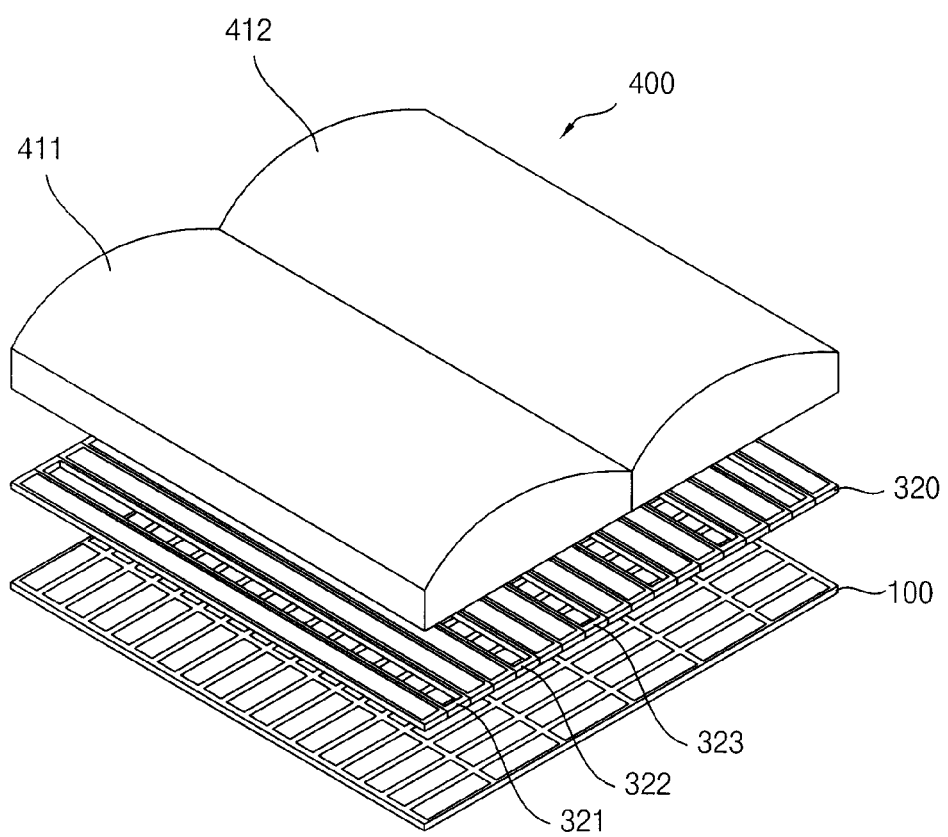
FIG. 7A is a perspective view illustrating the first lenticular lens and the second lenticular lens, a second auxiliary plate corresponding to the second pixel area and the display panel in accordance with an exemplary embodiment of the present invention.
Figure 7B:
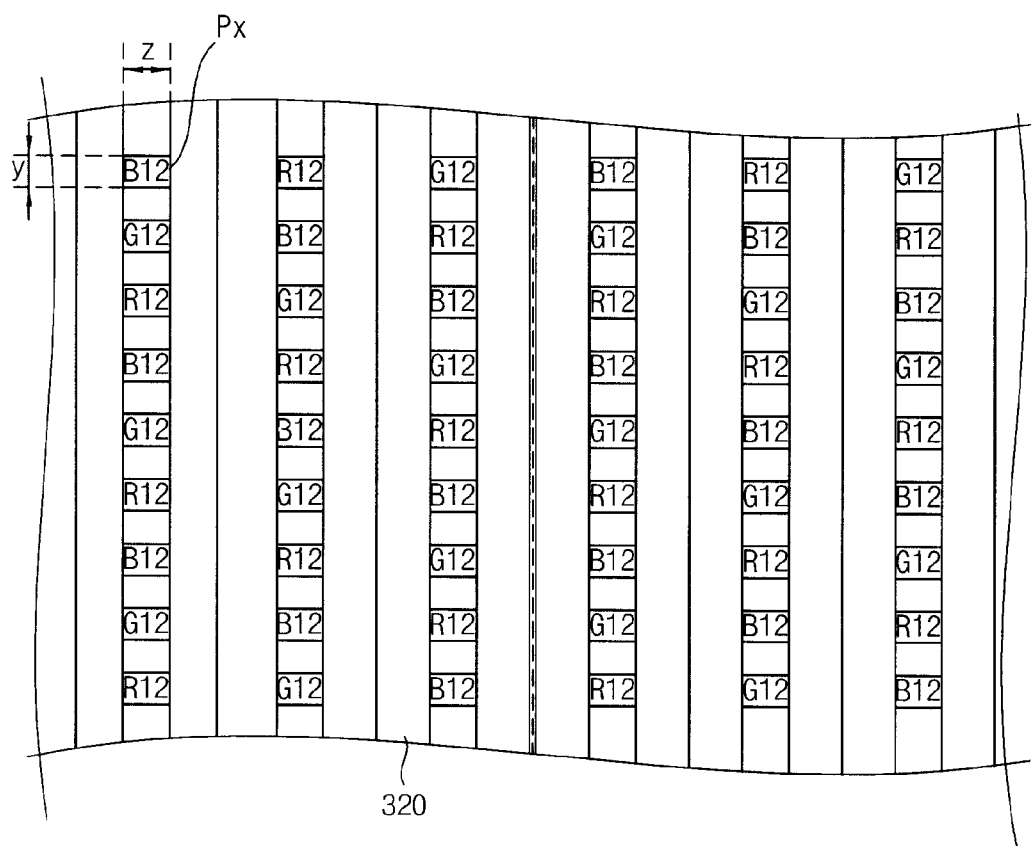
FIG. 7B is a plan view illustrating a disposed relationship between the second auxiliary plate and the display panel of FIG. 7A.

FIG. 7A is a perspective view illustrating the first lenticular lens 411, and the second lenticular lens 412, a second auxiliary plate 320 corresponding to the second pixel area R12, G12, and B12, shown in FIG. 7B, and the display panel 100 in accordance with an exemplary embodiment of the present invention.

FIG. 7B is a plan view illustrating a disposition relationship between the second auxiliary plate 320 and the display panel 100 of FIG. 7A.

Referring to FIG. 4, FIG. 5, FIG. 7A, and FIG. 7B, the temporal division plate 300, which exposes the second pixel area R12, G12, and B12 of the unit pixels Px, will be characterized as the second auxiliary plate 320.

The second auxiliary plate 320 includes a plurality of shutters. In order to view a stereoscopic image at the second viewpoint set V2, V5, and V8, a fourth shutter 321, a fifth shutter 322, and a sixth shutter 323 are opened. In this case, two shutters that are not opened are disposed between the fourth shutter 321 and the fifth shutter 322, and two shutters that are not opened are disposed between the fifth shutter 322 and the sixth shutter 323.

A length along the first direction D1 of the fourth shutter 321, the fifth shutter 322, and the sixth shutter 323 may be 'z'. A length along the first direction D1 of the unit pixels Px may be 'x'.

The second area R12, G12, and B12 of the unit pixels Px is exposed by the fourth shutter 321, the fifth shutter 322, and the sixth shutter 323. No image is displayed through the second auxiliary plate 320 in accordance with the unit pixels Px except the second pixel area R12, G12, and B12.

Figure 8A:
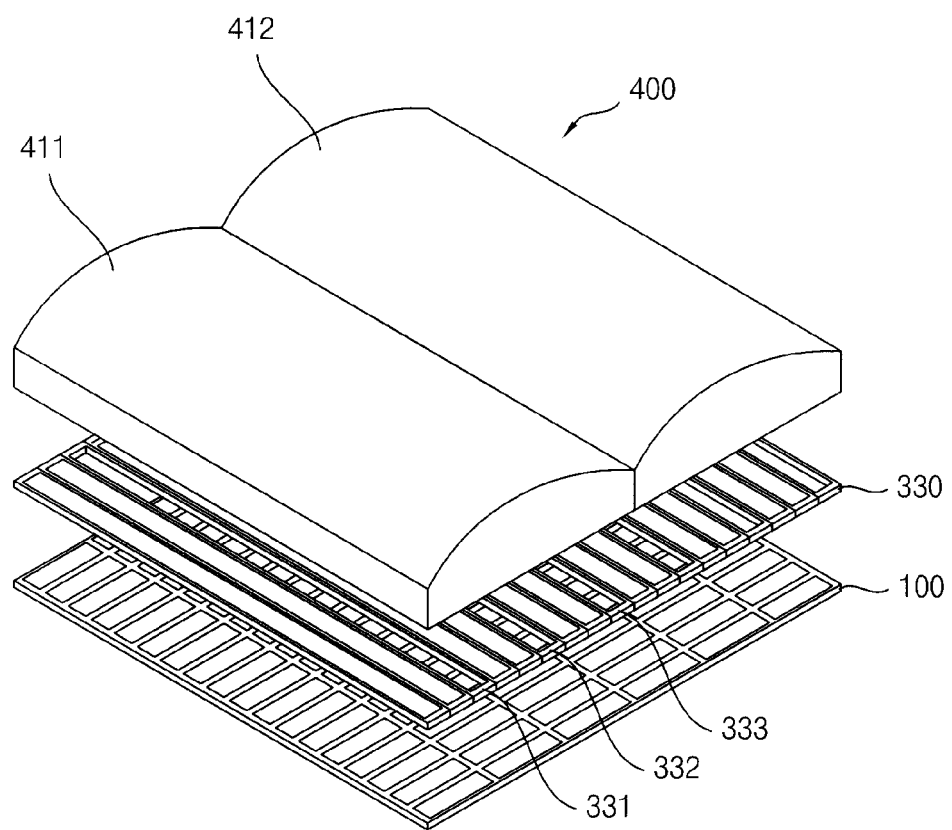
FIG. 8A is a perspective view illustrating the first lenticular lens and the second lenticular lens, a third auxiliary plate corresponding to the third pixel area and the display panel in accordance with an exemplary embodiment of the present invention.
Figure 8B:
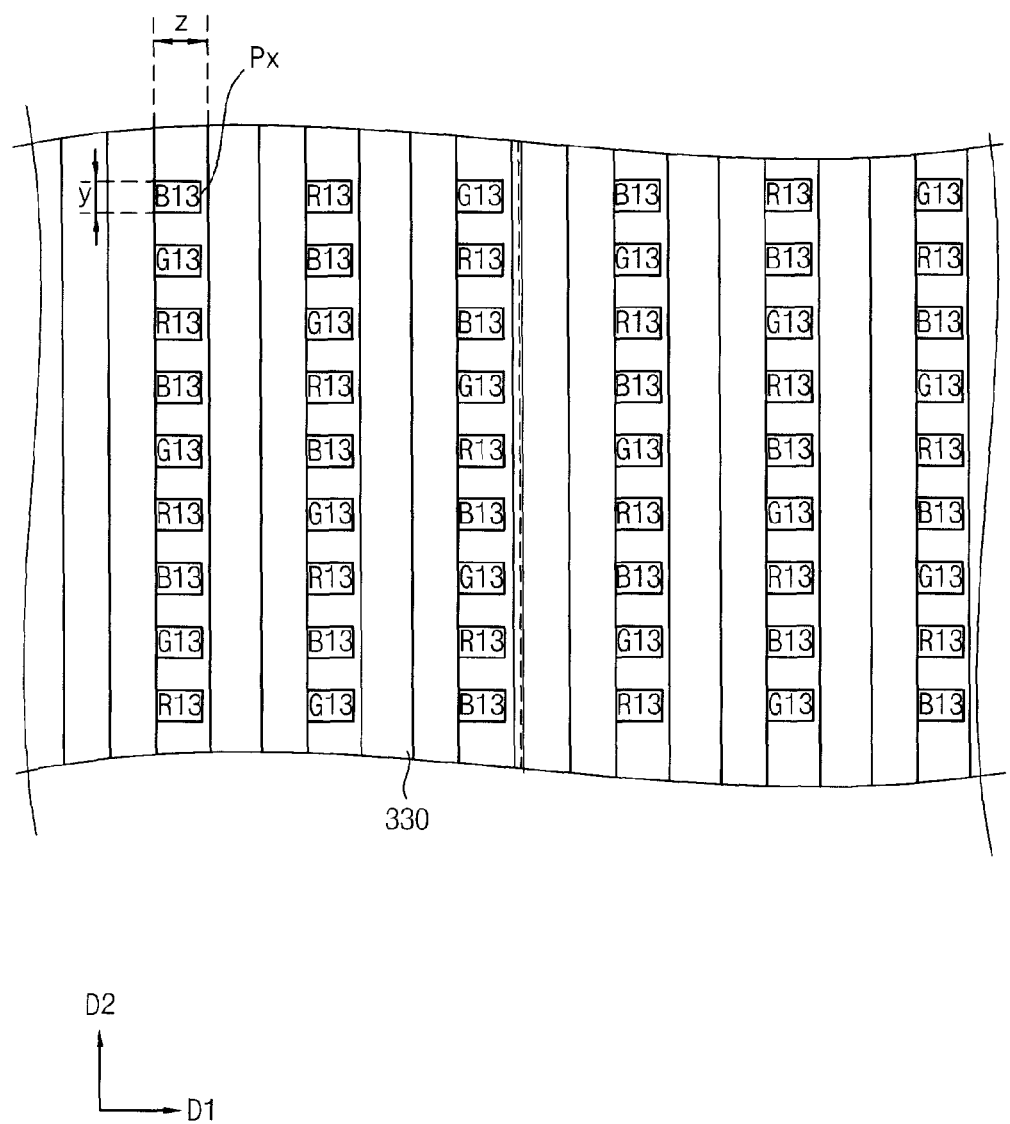
FIG. 8B is a plan view illustrating a disposed relationship between the third auxiliary plate and the display panel of FIG. 8A.

FIG. 8A is a perspective view illustrating the first lenticular lens 411 and the second lenticular lens 412, a third auxiliary plate 330 corresponding to the third pixel area R13, G13, and B13, shown in FIG. 8B, and the display panel 100 in accordance with an exemplary embodiment of the present invention.

FIG. 8B is a plan view illustrating a disposition relationship between the third auxiliary plate 330 and the display panel 100 of FIG. 8A.

Referring to FIG. 4, FIG. 5, FIG. 8A, and FIG. 8B, the temporal division plate 300, which exposes the third pixel area R13, G13, and B13 of the unit pixels Px, will be characterized as the third auxiliary plate 330.

The third auxiliary plate 330 includes a plurality of shutters. In order to view a stereoscopic image at the third viewpoint set V1, V4, and V7, a seventh shutter 331, an eighth shutter 332, and a ninth shutter 333 are opened. In this case, two shutters that are not opened are disposed between the seventh shutter 331 and the eighth shutter 332, and two shutters that are not opened are disposed between the eighth shutter 332 and the ninth shutter 333.

A length along the first direction D1 of the seventh shutter 331, the eighth shutter 332, and the ninth shutter 333 may be 'z'. A length along the first direction D1 of the unit pixels Px may be 'x'.

The third area R13, G13, and B13 of the unit pixels Px is exposed by the seventh shutter 331, the eighth shutter 332, and the ninth shutter 333. No image is displayed through the third auxiliary plate 330 in accordance with the unit pixels Px except the third pixel area R13, G13, and B13.

Referring again to FIG. 6B, FIG. 7B, and FIG. 8B, when the first pixel area R11, G11, and B11 is exposed by the first auxiliary plate 310, the second pixel area R12, G12, and B12 and the third pixel area R13, G13, and B13 may display a black image. When the second pixel area R12, G12, and B12 is exposed by the second auxiliary plate 320, the third pixel area R13, G13, and B13 and the first pixel area R11, G11, and B11, may display a black image. When the third pixel area R13, G13, and B13 is exposed by the third auxiliary plate 330, the first pixel area R11, G11, and B11 and the second pixel area R12, G12, and B12 may display a black image.

The instant black image is not seen by an observer. Rather, an image of the first pixel area R11, G11, and B11, an image of the second pixel area R12, G12, and B12, and an image of the first pixel area R13, G13, and B13 that are displayed before the black image is displayed thereon are seen by the observer.

Therefore, the display panel 100 may display nine images through the temporal division plate 300, and an observer may view a stereoscopic image at each of nine areas V1, V2, V3, V4, V5, V6, V7, V8, and V9 through the lenticular plate 400.

Figure 9:
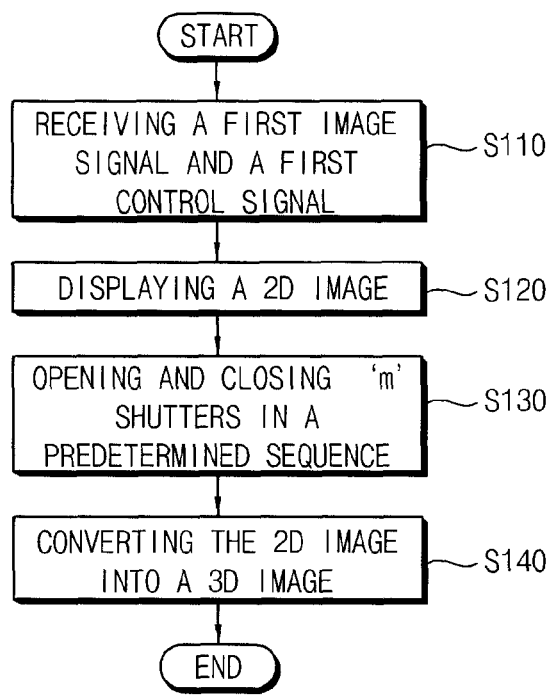
FIG. 9 is a flowchart showing a stereoscopic image processing process of the stereoscopic image display device of FIG. 1.

FIG. 9 is a flowchart showing a stereoscopic image processing process of the stereoscopic image display device 1000 of FIG. 1.

Referring to FIG. 1 and FIG. 9, the main control part 1210, in operation S110, receives the first image signal DS1 including stereoscopic image signals and the first control signal SS1 including stereoscopic control signals from an external device (not shown).

The display panel 100, in operation S120, displays the 2D image in response to data signals and gate signals that are generated based on the first image signal DS1 and the first control signal SS1. The display panel 100 may display two hundred forty still images per second. In the present exemplary embodiment, the still images sequentially displayed three times may include nine images different from each other photographed at nine viewpoints.

The temporal division plate 300 may partially expose the 2D image by opening a portion of the shutters. In this case, the temporal division control part 1240 controls sequence and timing of the shutters.

For example, the temporal division control part 1240, in operation S130, may sequentially open and close the 'm' shutters corresponding to each unit pixel Px.

The 'm' shutters may be opened and closed in a sequence along the first direction D1 in accordance with controlled timing, so that operation S130 may be performed.

In the present exemplary embodiment, a sequence of opening and closing of 'm' shutters corresponding to a first unit pixel may be identical to a sequence of opening and closing of m shutters corresponding to a second unit pixel adjacent to the first unit pixel. That is, (m−1) shutters that are not opened may be between shutters that are coincidentally opened, which are included in the temporal division plate 300. In this case, the opening and closing of the shutter may be performed two hundred forty times per second.

The lenticular lens 410 of the lenticular plate 400, in operation S140, converts the 2D image passing through the temporal division plate 300 into a 3D image in order to display the 3D image.

Thus, a 2D still image sequentially displayed three times may be converted into a 3D still mage, and the 3D image converted by the lenticular plate 400 may be driven at about 80 Hz.

According to an exemplary embodiment of the present invention, the display panel 100 of a horizontal pixel structure having a long side in parallel with the first direction D1 and a short side in parallel with the second direction D2, may display nine images through the temporal division plate 300, and an observer may view a stereoscopic image at nine areas V1, V2, V3, V4, V5, V6, V7, V8, and V9 through the lenticular plate 400.

Figure 10A:
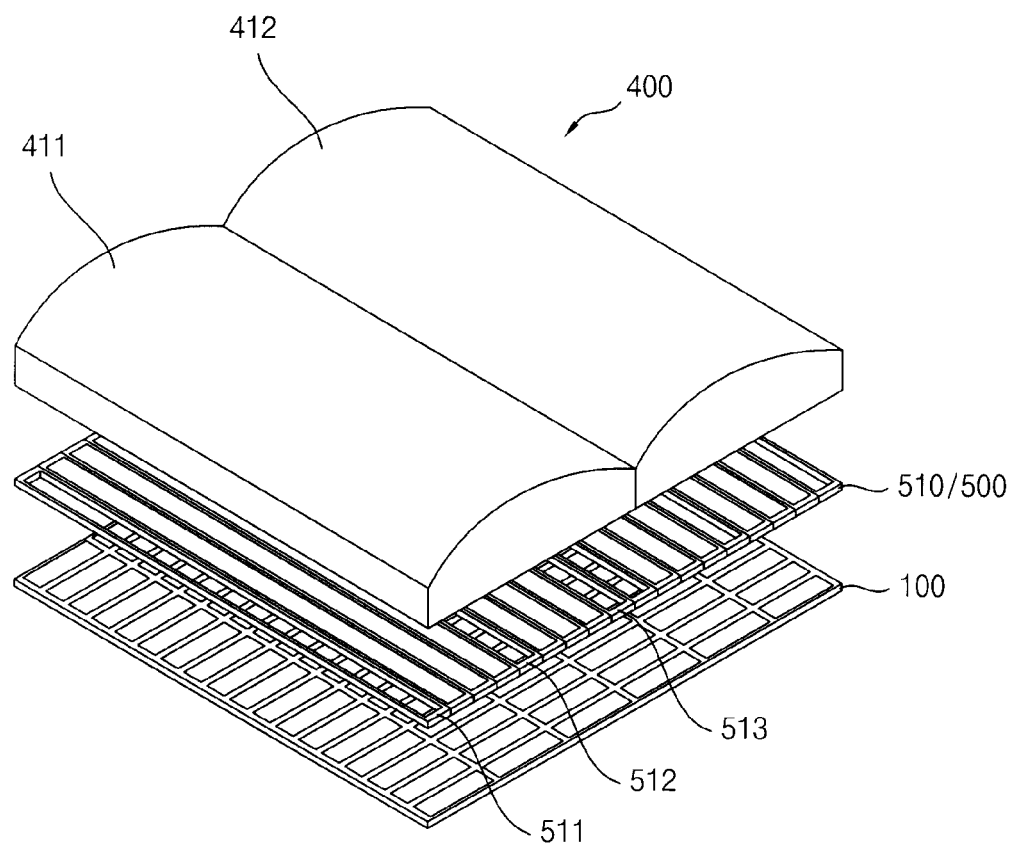
FIG. 10A is a perspective view illustrating the first lenticular lens and the second lenticular lens, a first auxiliary plate corresponding to the fourth pixel area and the display panel in accordance with an exemplary embodiment of the present invention.
Figure 10B:
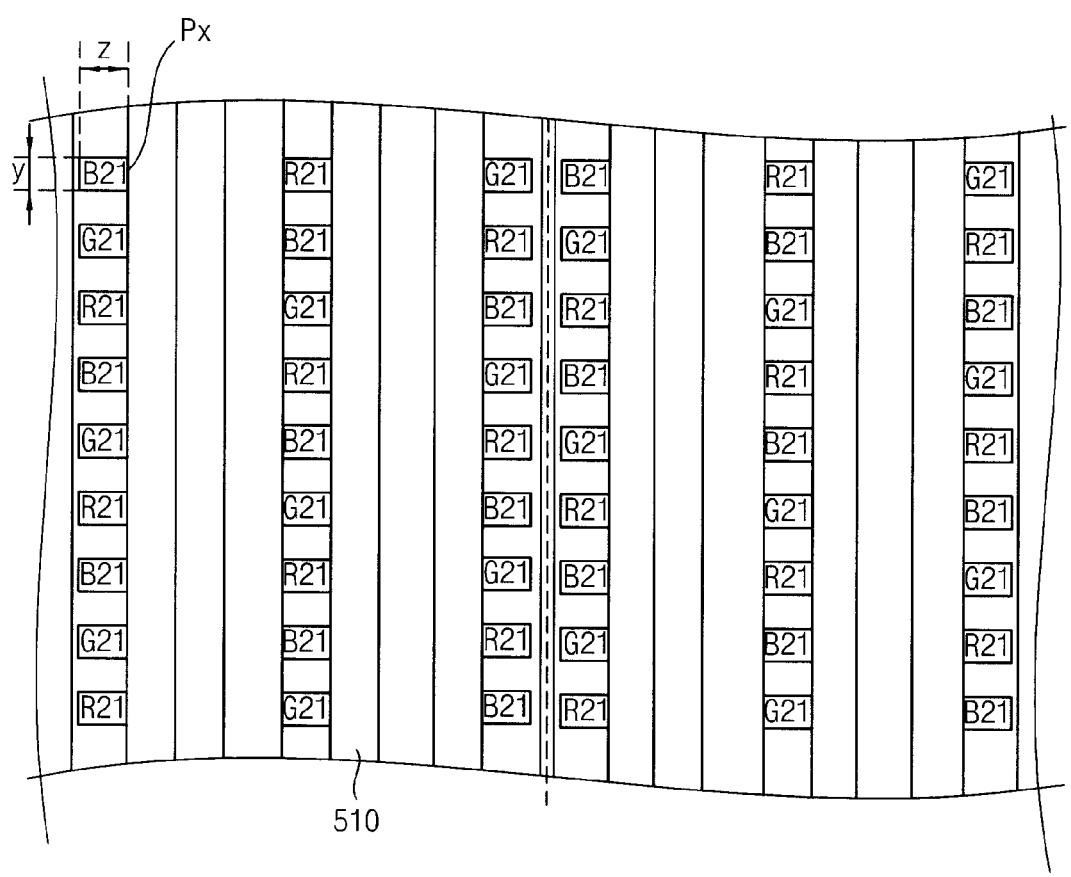
FIG. 10B is a plan view illustrating a disposed relationship between the first auxiliary plate and the display panel of FIG. 10A.

FIG. 10A is a perspective view illustrating the first lenticular lens 411 and the second lenticular lens 412, a fourth auxiliary plate 510 corresponding to the fourth pixel area R21, G21, and B21, shown in FIG. 10B, and the display panel 100 in accordance with an exemplary embodiment of the present invention.

FIG. 10B is a plan view illustrating a disposition relationship between the fourth auxiliary plate 510 and the display panel 100 of FIG. 10A.

The stereoscopic image display device according to the present exemplary embodiment is substantially the same as the stereoscopic image display device 1000 described in previous exemplary embodiments except for at least the temporal division plate 500. Thus, in some instances the same reference numerals will be used to refer to the same or like parts in FIG. 10B as those described in previous exemplary embodiments, and any further explanation concerning the such elements will be omitted.

Referring to FIG. 4, FIG. 5, FIG. 10A, FIG. 10B, FIG. 11A, FIG. 11B, FIG. 12A, and FIG. 12B, the temporal division plate 500 that exposes the fourth pixel area R21, G21, and B21 of the unit pixels Px, will be characterized as the fourth auxiliary plate 510. The temporal division plate 500 that exposes the fifth pixel area R22, G22, and B22 will be characterized as the fifth auxiliary plate 520. The temporal division plate 500 that exposes the sixth pixel area R23, G23, and B23 will be characterized as the sixth auxiliary plate 530.

The fourth auxiliary plate 510 includes a plurality of shutters. In order to view a stereoscopic image at a fourth viewpoint set V1, V5, and V9, a tenth shutter 511, an eleventh shutter 512, and a twelfth shutter 513 are opened. In this case, three shutters that are not opened may be disposed between the tenth shutter 511 and the eleventh shutter 512, and three shutters that are not opened may be disposed between the eleventh shutter 512 and the twelfth shutter 513.

A length along the first direction D1 of the tenth shutter 511, the eleventh shutter 512, and the twelfth shutter 513 may be 'z'. A length along the first direction D1 of the unit pixels Px may be 'x'.

The fourth area R21, G21, and B21 of the unit pixels Px is exposed by the tenth shutter 511, the eleventh shutter 512, and the twelfth shutter 513. No image is displayed through the fourth auxiliary plate 510 in accordance with the unit pixels Px except the fourth pixel area R21, G21, and B21.

Figure 11A:
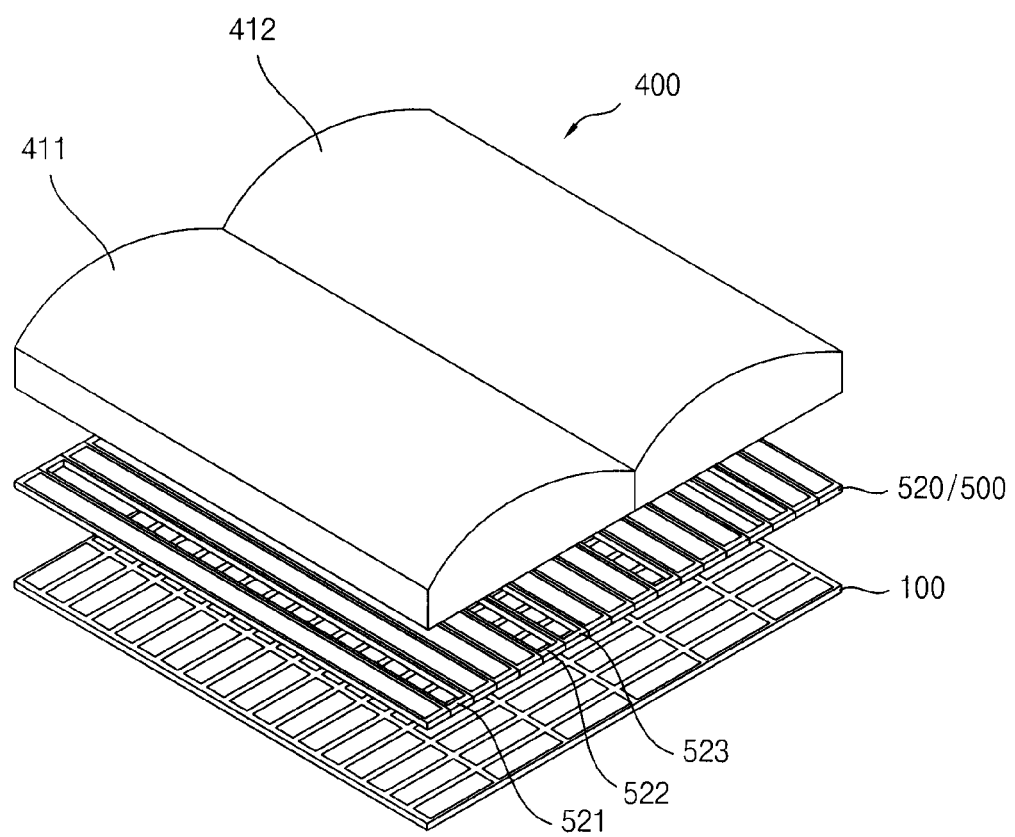
FIG. 11A is a perspective view illustrating the first lenticular lens and the second lenticular lens, a fifth auxiliary plate corresponding to the fifth pixel area and the display panel in accordance with an exemplary embodiment of the present invention.
Figure 11B:
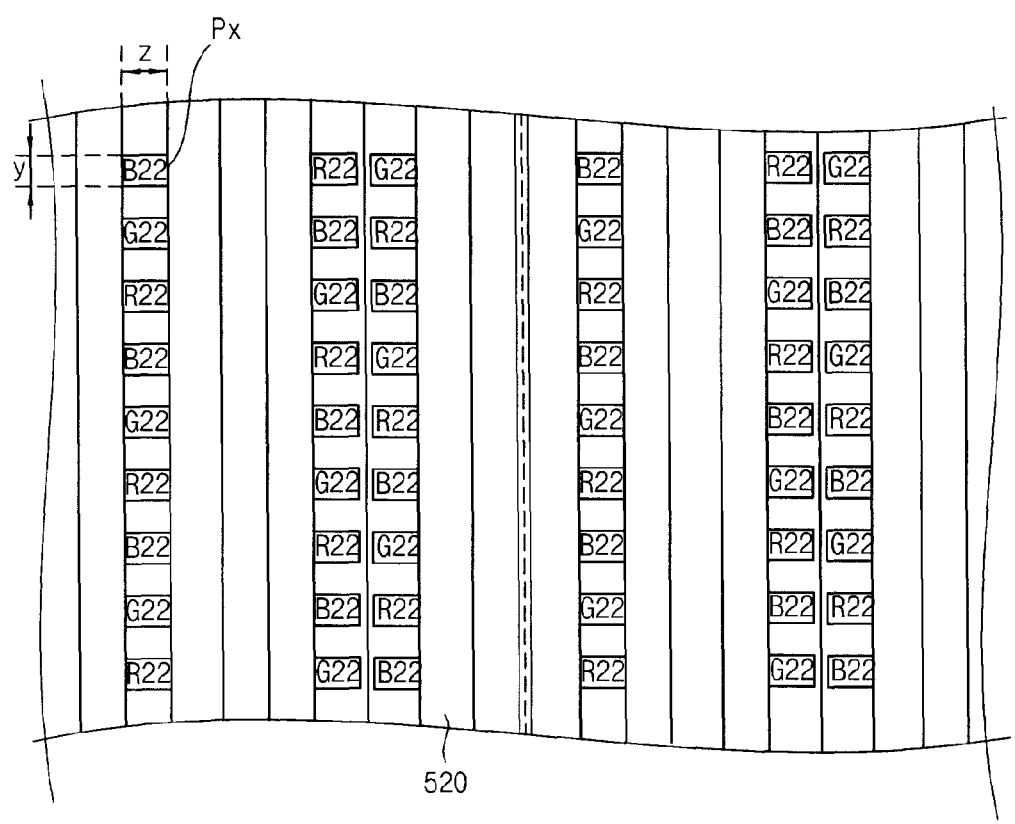
FIG. 11B is a plan view illustrating a disposed relationship between the fifth auxiliary plate and the display panel of FIG. 11A.

FIG. 11A is a perspective view illustrating the first lenticular lens 411 and the second lenticular lens 412, a fifth auxiliary plate 520 corresponding to the fifth pixel area R22, G22, and B22, shown in FIG. 11B, and the display panel 100 in accordance with an exemplary embodiment of the present invention.

FIG. 11B is a plan view illustrating a disposition relationship between the fifth auxiliary plate 520 and the display panel 100 of FIG. 11A.

Referring to FIG. 4, FIG. 5, FIG. 11A, and FIG. 11B, the fifth auxiliary plate 520 includes a plurality of shutters. In order to view a stereoscopic image at a fifth viewpoint set V3, V4, and V8, a thirteenth shutter 521, a fourteenth shutter 522, and a fifteenth shutter 523 are opened. In this case, three shutters that are not opened are disposed between the thirteenth shutter 521 and the fourteenth shutter 522, and zero shutters that are not opened are disposed between the fourteenth shutter 522 and the fifteenth shutter 523.

A length along the first direction D1 of the thirteenth shutter 521, the fourteenth shutter 522, and the fifteenth shutter 523 may be 'z'. A length along the first direction D1 of the unit pixels Px may be 'x'.

The fifth area R22, G22, and B22 of the unit pixels Px is exposed by the thirteenth shutter 521, the fourteenth shutter 522, and the fifteenth shutter 523. No image is displayed through the fifth auxiliary plate 520 in accordance with the unit pixels Px except the fifth pixel area R22, G22, and B22.

Figure 12A:
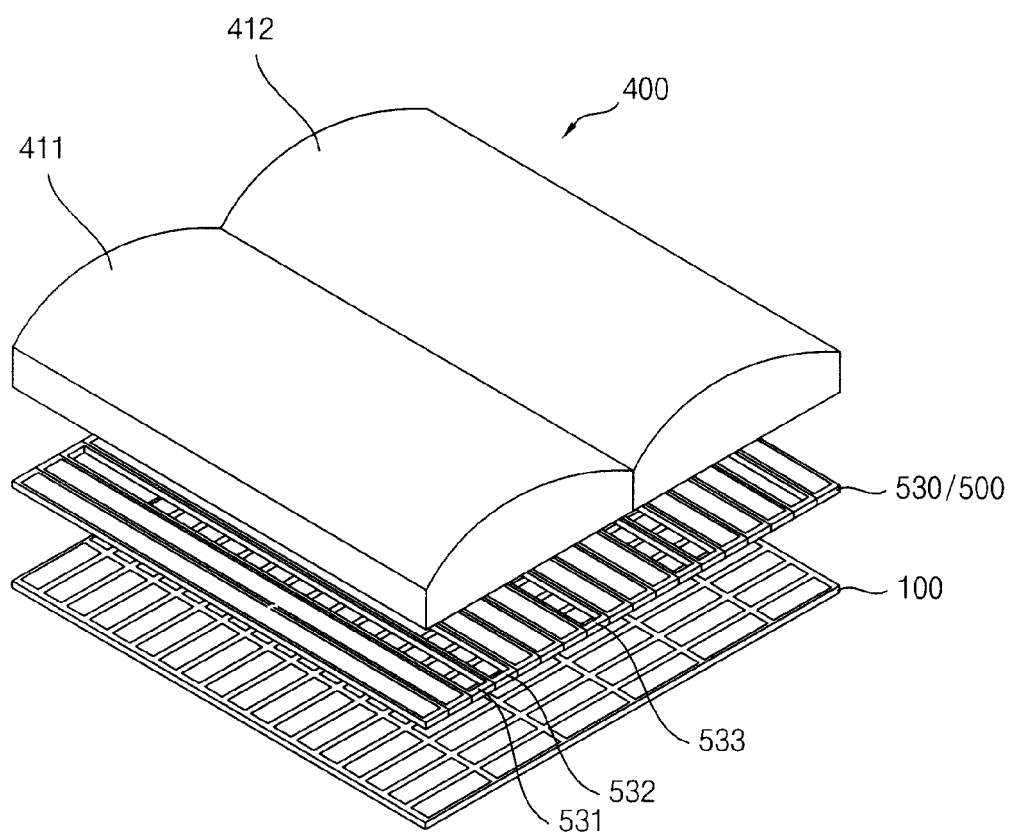
FIG. 12A is a perspective view illustrating the first lenticular lens and the second lenticular lens, a sixth auxiliary plate corresponding to the sixth pixel area and the display panel in accordance with an exemplary embodiment of the present invention.
Figure 12B:
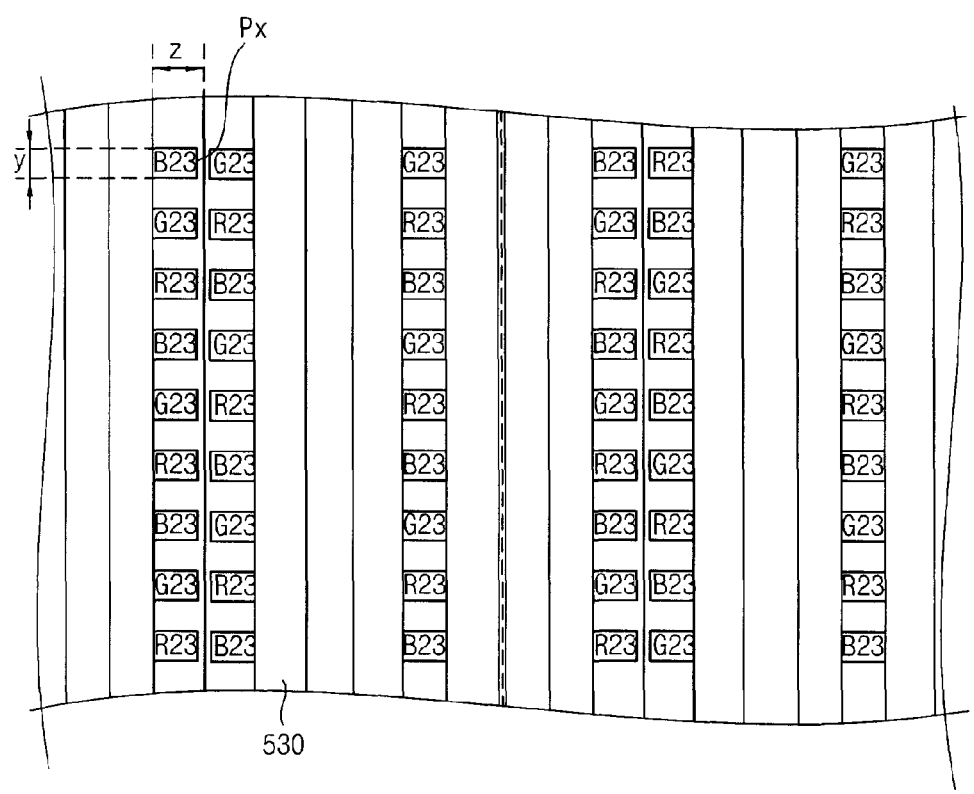
FIG. 12B is a plan view illustrating a disposed relationship between the sixth auxiliary plate and the display panel of FIG. 12A.

FIG. 12A is a perspective view illustrating the first lenticular lens 411 and the second lenticular lens 412, a sixth auxiliary plate 530 corresponding to the sixth pixel area R23, G23, and B23, shown in FIG. 12B, and the display panel 100 in accordance with an exemplary embodiment of the present invention.

FIG. 12B is a plan view illustrating a disposition relationship between the sixth auxiliary plate 530 and the display panel 100 of FIG. 12A.

Referring to FIG. 4, FIG. 5, FIG. 12A, and FIG. 12B, the sixth auxiliary plate 530 includes a plurality of shutters. In order to view a stereoscopic image at a sixth viewpoint set V2, V6, and V7, a sixteenth shutter 531, a seventeenth shutter 532, and an eighteenth shutter 533 are opened. In this case, zero shutters that are not opened are disposed between the sixteenth shutter 531 and the seventeenth shutter 532, and three shutters that are not opened are disposed between the seventeenth shutter 532 and the eighteenth shutter 533.

A length along the first direction D1 of the sixteenth shutter 531, the seventeenth shutter 532, and the eighteenth shutter 533 may be 'z'. A length along the first direction D1 of the unit pixels Px may be 'y'.

The sixth area R33, G33, and B33 of the unit pixels Px is exposed by the sixteenth shutter 531, the seventeenth shutter 532, and the eighteenth shutter 533. No image is displayed through the sixth auxiliary plate 530 in accordance with the unit pixels Px except the sixth pixel area R33, G33, and B33.

Referring again to FIG. 10B, FIG. 11B, and FIG. 12B, when the fourth pixel area R21, G21, and B21 is exposed by the fourth auxiliary plate 510, the fifth pixel area R22, G22, and B22 and the sixth pixel area R23, G23, and B23 may display a black image. When the fifth pixel area R22, G22, and B22 is exposed by the fifth auxiliary plate 520, the sixth pixel area R23, G23, and B23 and the fourth pixel area R21, G21, and B21 may display a black image. When the sixth pixel area R23, G23, and B23 is exposed by the sixth auxiliary plate 530, the fourth pixel area R21, G21, and B21 and the fifth pixel area R22, G22, and B22 may display a black image.

The instant black image is not seen by an observer. Rather, an image of the fourth pixel area R21, G21, and B21, an image of the fifth pixel area R22, G22, and B22, and an image of the sixth pixel area R23, G23, and B23 that are displayed before the black image is displayed thereon are seen by the observer.

Therefore, the display panel 100 may display nine images through the temporal division plate 500, and an observer may view a stereoscopic image at each of nine areas V1, V2, V3, V4, V5, V6, V7, V8, and V9 through the lenticular plate 400.

A process for processing a 3D image by a stereoscopic image display device of the present exemplary embodiment is substantially the same as the process for processing a 3D image by the stereoscopic image display device of previous exemplary embodiments except that the sequence that shutters corresponding to unit pixels may be different. Thus any further explanation concerning the above elements will be omitted. In this case, no more than 'm' shutters that are not opened may be disposed between shutters that are simultaneously opened.

According to an exemplary embodiment of the present invention, the display panel 100 of a horizontal pixel structure having a long side in parallel with the first direction D1 and a short side in parallel with the second direction D2 may display nine images by using the temporal division plate 500, and an observer may view a stereoscopic image at nine areas V1, V2, V3, V4, V5, V6, V7, V8, and V9 through the lenticular plate 400.

As described above, the stereoscopic image display device according to the present invention has a horizontal pixel structure and the temporal division plate has a plurality of shutters, and the temporal division plate opens and closes a portion of the shutters, so that the lenticular plate may convert a 2D image into a 3D image.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and the present invention is not to be construed as limited to the specific exemplary embodiments disclosed, and that modifications to the disclosed exemplary embodiments, as well as other embodiments, are intended to be included within the scope of the appended claims. The present invention is defined by the following claims, with equivalents of the claims to be included therein.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of displaying a stereoscopic image, the method comprising:
   receiving an image signal;
   displaying a two-dimensional (2D) image on a display panel based on the image signal, the display panel comprising a plurality of gate lines extending in a first direction, a plurality of data lines extending in a second direction, and a plurality of unit pixels disposed in both the first direction and the second direction, each of the plurality of unit pixels comprising a long side in parallel with the first direction and a short side in parallel with the second direction;
   opening and closing m shutters in a first sequence, 'm' being a natural number no less than 2, the m shutters corresponding to each of the unit pixels disposed in the first direction, the m shutters being included in a temporal division plate comprising a plurality of shutters, the temporal division plate being disposed on the display panel such that each of the plurality of shutters extends in the second direction; and
   converting the 2D image into a three-dimensional (3D) image, the 2D image passing through the temporal division plate and through a plurality of lenticular lenses disposed on the temporal division plate.

2. The method of claim 1, wherein n unit pixels are disposed in the first direction in correspondence with each of the plurality of lenticular lenses, 'n' being a natural number no less than 3.

3. The method of claim 2, wherein 'n' and 'm' are both 3.

4. The method of claim 1, wherein the m shutters are opened and closed one by one in the first sequence along the first direction.

5. The method of claim 4, wherein,
   m shutters corresponding to a first unit pixel are opened and closed in a first sequence,
   m shutters corresponding to a second unit pixel adjacent to the first unit pixel in the first direction are opened and closed in a second sequence, and
   the second sequence is identical to the first sequence.

6. The method of claim 4, wherein,
   m shutters corresponding to a first unit pixel are opened and closed in a first sequence,
   m shutters corresponding to a second unit pixel adjacent to the first unit pixel in the first direction are opened and closed in a second sequence, and
   the second sequence is different than the first sequence.

7. The method of claim 1, wherein a driving frequency of the display panel is 240 Hz.

8. The method of claim 1, wherein a driving frequency of each of the m shutters is equal to a driving frequency of the display panel divided by m.

9. The method of claim 1, wherein a driving frequency of the 3D image is equal to a driving frequency of the display panel divided by m.

10. A stereoscopic image display device, comprising:
    a display panel to display a two-dimensional (2D) image based on an image control signal, the display panel comprising a plurality of gate lines extending in a first direction, a plurality of data lines extending in a second direction, and a plurality of unit pixels disposed in both the first direction and the second direction, each of the plurality of unit pixels comprising a long side in parallel with the first direction and a short side in parallel with the second direction;
    a temporal division plate disposed on the display panel, the temporal division plate comprising a plurality of shutters, each of the plurality of shutters extending in the second direction, wherein the temporal division plate is configured to open and close m shutters in a sequence, 'm' being a natural number no less than 2, the m shutters corresponding to each of the unit pixels disposed in the first direction; and
    a plurality of lenticular lenses disposed on the temporal division plate to convert the 2D image passing through the temporal division plate into a three-dimensional (3D) image.

11. The stereoscopic image display device of claim 10, wherein the number of the gate lines is greater than the number of the data lines.

12. The stereoscopic image display device of claim 10, wherein
the plurality of lenticular lenses are disposed on a lenticular plate, and
the lenticular plate has a cross-sectional shape in which semicircles of the same size are arranged in a row.

13. The stereoscopic image display device of claim 10, wherein the temporal division plate opens and closes the m shutters one by one in the sequence along the first direction.

14. The stereoscopic image display device of claim 10, wherein n unit pixels are disposed in the first direction in correspondence with each of the plurality of lenticular lenses, 'n' being a natural number no less than 3.

15. The stereoscopic image display device of claim 14, wherein 'n' and 'm' are both 3.

16. The stereoscopic image display device of claim 10, wherein a driving frequency of each of the m shutters is equal to a driving frequency of the display panel divided by m.

17. The stereoscopic image display device of claim 10, wherein a driving frequency of the display panel is 240 Hz.

18. The stereoscopic image display device of claim 10, wherein a driving frequency of the 3D image is equal to a driving frequency of the display panel divided by m.

19. The stereoscopic image display device of claim 10, wherein
the plurality of unit pixels comprises a red color pixel, a green color pixel and a blue color pixel,
colors of the pixels adjacent to each other along the first direction are different from each other, and
colors of the pixels adjacent to each other along the second direction are different from each other.

20. The stereoscopic image display device of claim 10, wherein each of the plurality of shutters covers 1/m of the each of the plurality of unit pixels.

21. The stereoscopic image display device of claim 10, wherein the temporal division plate is configured to sequentially expose the respective of the plurality of unit pixels and to open and close a portion of the m shutters to partially expose the 2D image, wherein a length of the long side of the unit pixel is m times the width of the each of the plurality of shutters.

* * * * *